(12) United States Patent
Wager et al.

(10) Patent No.: US 10,462,813 B2
(45) Date of Patent: *Oct. 29, 2019

(54) METHOD AND APPARATUS FOR CONTENTION-BASED GRANTING IN A WIRELESS COMMUNICATION NETWORK

(71) Applicant: Telefonaktiebolaget LM Ericsson (Publ), Stockholm (SE)

(72) Inventors: Stefan Henrik Andreas Wager, Espoo (FI); Henrik Enbuske, Stockholm (SE); Anders Furuskär, Stockholm (SE); Magnus Stattin, Sollentuna (SE); Michael Meyer, Aachen (DE); Anna Larmo, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 276 days.

This patent is subject to a terminal disclaimer.

(21) Appl. No.: 14/301,831

(22) Filed: Jun. 11, 2014

(65) Prior Publication Data

US 2014/0307667 A1 Oct. 16, 2014
US 2016/0302227 A9 Oct. 13, 2016

Related U.S. Application Data

(63) Continuation of application No. 13/006,559, filed on Jan. 14, 2011, now Pat. No. 8,767,644.

(Continued)

(51) Int. Cl.
*H04W 74/00* (2009.01)
*H04W 72/04* (2009.01)
(Continued)

(52) U.S. Cl.
CPC ......... *H04W 74/004* (2013.01); *H04W 28/04* (2013.01); *H04W 72/04* (2013.01);
(Continued)

(58) Field of Classification Search
CPC ... H04W 72/04; H04W 72/042; H04W 28/04; H04W 74/004; H04W 74/0833
See application file for complete search history.

(56) References Cited

U.S. PATENT DOCUMENTS

| 8,670,395 B2 * | 3/2014 | Singh | H04W 74/0875 370/329 |
| 2006/0104256 A1 | 5/2006 | Klotsche et al. | |

(Continued)

FOREIGN PATENT DOCUMENTS

| EP | 1901574 A1 | 3/2008 |
| EP | 2096783 A2 | 9/2009 |

(Continued)

OTHER PUBLICATIONS

3RD Generation Partnership Project. 3GPP TR 36.912, V9.1.0 (Dec. 2009). 3rd Generation Partnership Project; Technical Specification Group Radio Access Network; Feasibility study for Further Advancements for E-UTRA (LTE-Advanced) (Release 9), Dec. 2009, Sophia Antipolis Valbonne, France, pp. 1-58.

(Continued)

*Primary Examiner* — Michael Thier
*Assistant Examiner* — Brian P Cox
(74) *Attorney, Agent, or Firm* — Coats & Bennett, PLLC

(57) ABSTRACT

In one aspect of the disclosed teachings, associating a plurality of contention-based uplink grants with a range of uplink resource blocks allows one contention-based uplink grant message to signal the entire plurality of grants. As an example in the LTE context, the signaling load on the PDCCH is reduced by using a single contention-based uplink grant message to signal a plurality of contention-based uplink grants. The message indicates an allocated set of uplink resource blocks and the number of separate uplink resource grants represented by the set is known or signaled, such that user terminals recognize that separate subsets of (Continued)

uplink resource blocks within the set each correspond to a separate contention-based uplink grant. Information included in the contention-based uplink grant message, or otherwise signaled can be used to control the probability at which the user terminals attempt contention-based uplink transmissions and/or to control the MCS used for such transmissions.

37 Claims, 6 Drawing Sheets

Related U.S. Application Data

(60) Provisional application No. 61/295,383, filed on Jan. 15, 2010.

(51) Int. Cl.
*H04W 74/08* (2009.01)
*H04W 28/04* (2009.01)

(52) U.S. Cl.
CPC ....... *H04W 72/042* (2013.01); *H04W 74/006* (2013.01); *H04W 74/0833* (2013.01)

(56) References Cited

U.S. PATENT DOCUMENTS

| | | | |
|---|---|---|---|
| 2007/0133461 A1 | 6/2007 | Lenzini et al. | |
| 2009/0092086 A1* | 4/2009 | Lee | H04B 7/2615 370/329 |
| 2009/0213815 A1* | 8/2009 | Sherman | H04W 74/0841 370/336 |
| 2009/0310692 A1* | 12/2009 | Kafle | H04L 5/0007 375/260 |
| 2010/0074172 A1 | 3/2010 | Fontaine et al. | |
| 2010/0091725 A1 | 4/2010 | Ishii | |
| 2010/0105405 A1 | 4/2010 | Vujcic | |
| 2010/0110999 A1 | 5/2010 | Li et al. | |
| 2010/0111029 A1 | 5/2010 | Chou et al. | |
| 2010/0113040 A1 | 5/2010 | Tzavidas et al. | |
| 2010/0150405 A1 | 6/2010 | Butto | |
| 2010/0197308 A1 | 8/2010 | Rácz et al. | |
| 2011/0039568 A1* | 2/2011 | Zhang | H04W 52/50 455/452.1 |
| 2011/0075684 A1* | 3/2011 | Zeng | H04L 1/1861 370/475 |
| 2011/0128928 A1* | 6/2011 | Lin | H04W 74/0833 370/329 |
| 2012/0082200 A1 | 4/2012 | Verikoukis et al. | |
| 2012/0099453 A1 | 4/2012 | Ságfors et al. | |
| 2012/0182977 A1* | 7/2012 | Hooli | H04W 72/1278 370/336 |

FOREIGN PATENT DOCUMENTS

| | | |
|---|---|---|
| EP | 2101539 A2 | 9/2009 |
| EP | 2101539 B1 | 11/2011 |
| FR | 2916591 A1 | 11/2008 |
| RU | 2324304 C2 | 5/2008 |
| WO | 2007/022787 A1 | 3/2007 |
| WO | 2007/078177 A1 | 7/2007 |
| WO | 2009135435 A1 | 11/2009 |
| WO | 2009145545 A2 | 12/2009 |
| WO | 2010057540 A1 | 5/2010 |
| WO | 2011037503 A1 | 3/2011 |
| WO | 2011043709 A1 | 4/2011 |

OTHER PUBLICATIONS

3RD Generation Partnership Project. 3GPP TR 36.913, V9.0.0 (Dec. 2009). 3rd Generation Partnership Project; Technical Specification Group Radio Access Network; Requirements for further advancements for Evolved Universal Terrestrial Radio Access (E-UTRA) (LTE-Advanced) (Release 9), Dec. 2009, Sophia Antipolis Valbonne, France, pp. 1-15.

3RD Generation Partnership Project. "Latency Reductions for LTE." RP-091449, 3GPP Work Item Description, Nov. 2009, pp. 1-4.

3RD Generation Partnership Project. "Minor Additions to 36.912." 3GPP TSG-RAN WG2 Meeting #67,R2-095329, Shenzhen, China, Aug. 24-28, 2009, pp. 1-6.

Narasimhan et al., "A New Protocol for the Integration of Voice and Data over PRMA," IEEE Journal on Selected Areas in Communications, May 1996, pp. 623-631, vol. 14, No. 1, IEEE Service Center, Piscataway, NJ.

Ericsson et al., "Contention Based Uplink Transmissions," 3GPP TSG-RAN WG2 #66bis, R2-093812, Jun. 29-Jul. 3, 2009, Los Angeles, CA, pp. 1-4.

Ericsson, "Details of Latency Reduction Alternatives," 3GPP TSG-RAN WG2 #68, R2-096759, Nov. 9-13, 2009, Jeju, Korea, pp. 1-7.

ETSI. "LTE; Feasibility study for Further Advancements for E-UTRA (LTE-Advanced)(3GPP TR 36.912 version 9.1.0 Release 9)." ETSI TR 136 912 V9.1.0, Jan. 2010, Sophia Antipolis Cedex, France, pp. 1-60.

* cited by examiner

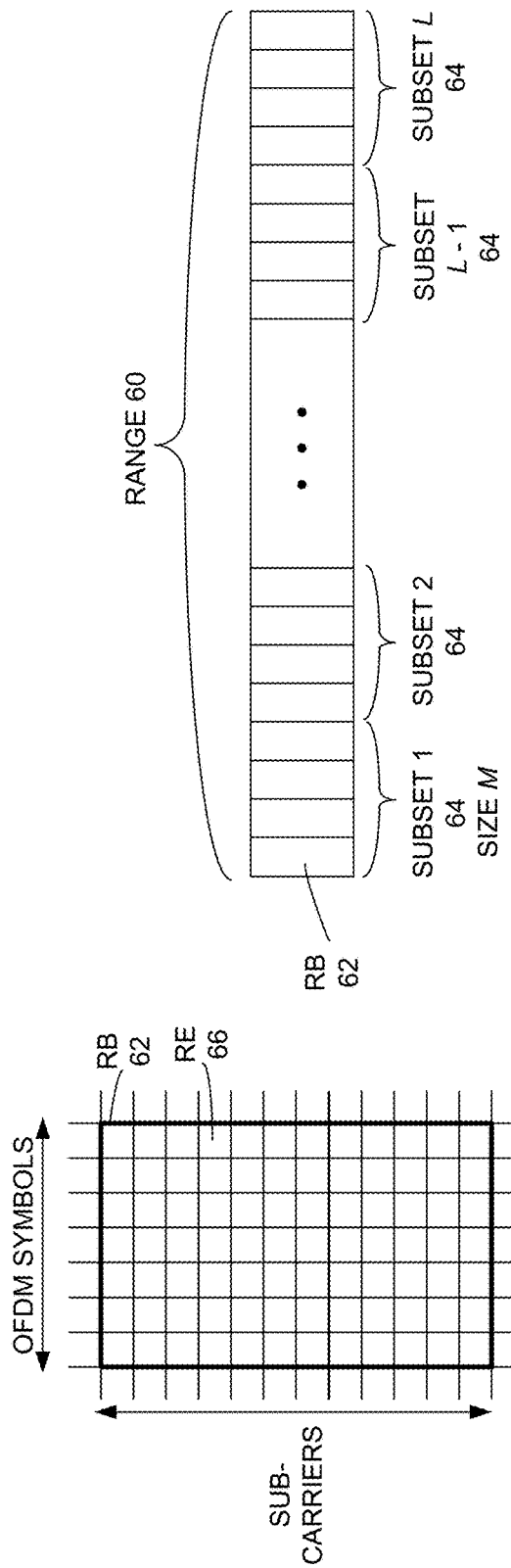

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |

*FIG. 6A*

(CONTINUED FROM FIG. 6A)

| | | | |
|---|---|---|---|
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved || 1 |
| 30 | reserved || 2 |
| 31 | reserved || 3 |

*FIG. 6B*

| INDEX VALUE | ACCESS PROB. CONTROL VALUE |
|---|---|
| 00 | 1 |
| 01 | 0.5 |
| 10 | 0.25 |
| 11 | 0.1 |

*FIG. 7*

METHOD AND APPARATUS FOR CONTENTION-BASED GRANTING IN A WIRELESS COMMUNICATION NETWORK

RELATED APPLICATIONS

This application is a continuation of U.S. patent application Ser. No. 13/006,559, filed on Jan. 14, 2011, which claims priority from U.S. Provisional Patent Application No. 61/295,383 filed on Jan. 15, 2010, all of which are hereby incorporated by reference herein in their entirety.

BACKGROUND

In 3rd Generation Partnership Project, "3GPP", Long Term Evolution, "LTE", networks, a dormant user terminal is known at the cell level and retains its Radio Resource Connection, "RRC", and established radio bearers. However, a user terminal entering dormancy activates discontinuous reception/transmission, "DRX", for power savings during periods of temporary inactivity. Because user terminals are quickly moved into the dormancy sub-state, quick reactivation of the user terminal is crucial for good system performance. Consequently, the 3GPP Release-10, also referred to as LTE-Advanced, target for the dormant to active transition is 10 ms, excluding the DRX cycle—see the 3GPP Technical Specification, "TS", 36.913 for more information.

To achieve this activation time target, working groups associated with developing relevant portions of the LTE standard have proposed mechanisms for reducing user-plane latency. One approach involves the use of contention-based access techniques for reducing latency. See 3GPP TS 36.912 for example information.

Contention-based uplink transmissions allow network-synchronized user terminals to transmit uplink data without sending Scheduling Requests, SRs, in advance. Eliminating the need for SRs reduces both the latency and signaling overhead. Such an approach can be particularly advantageous for small transmissions where the overhead associated with securing dedicated resources is not warranted.

Fast dynamic assignment of uplink resources for use in making contention-based transmissions is achieved by using the Downlink Physical Control Channel, "PDCCH", to send grants. By using the PDCCH, contention-based uplink grants can be assigned to unused uplink resources on a per sub-frame basis, so that scheduling of uplink contention-free transmissions is not affected. In this way, a static assignment of contention-based uplink resources can be avoided, and instead be dynamically assigned, depending on the uplink load.

Contention Based Radio Network Temporary Identifiers, "CB-RNTI", are used to identify contention-based uplink grants on the PDCCH. The contention-based uplink grants can have the same format as used for Release-8 user equipments, UEs, where the grant information specifies the granted resource blocks, the Modulation and Coding Scheme, "MCS", and Transport Format, "TF", to be used for a given contention-based uplink transmission. Further, for the LTE context, a new format known to Release-10 user terminals may be used for making contention-based uplink grants.

However, with several users in a cell, collision probability becomes an issue for contention-based transmissions on the uplink. If several user terminals attempt a contention-based uplink transmission responsive to the same contention-based uplink grant—i.e., on the same set of uplink resources allocated by a contention-based uplink grant—a transmission collision results and it is likely that none of the transmissions will be successful. One approach to reducing the likelihood of collision involves signaling more than one contention-based uplink grant within a given sub-frame but such approaches correspondingly entail significant and undesirable increases in the signaling overhead.

SUMMARY

In one aspect of the disclosed teachings, associating a plurality of contention-based uplink grants with a range or set of uplink resource blocks allows one contention-based uplink grant message to signal the entire plurality of grants. As an example in the LTE context, the signaling load on the PDCCH is reduced by using a single contention-based uplink grant message to signal a plurality of contention-based uplink grants. The message indicates an allocated range of uplink resource blocks and the number of separate uplink resource grants represented by the range is known or signaled, such that user terminals recognize that different subsets of uplink resource blocks within the range or set each correspond to a separate contention-based uplink grant. Information included in the contention-based uplink grant message or otherwise signaled can be used to control the probability at which the user terminals attempt contention-based uplink transmissions and/or to control the MCS used for such transmissions.

Accordingly, in one embodiment, a wireless communication network node is configured to implement a method wherein it signals contention-based uplink grants to user equipments, e.g., terminals or other wireless communication devices. The node comprises a transceiver that is configured to transmit downlink signals to said equipments and receive uplink signals from them. The node further comprises a scheduling processor that is operatively associated with the transceiver and configured to allocate a range of uplink resource blocks for use in making a plurality of contention-based uplink grants within a given scheduling interval.

The range of uplink resource blocks comprises different subsets of uplink resource blocks, where each contention-based uplink grant in the plurality of contention-based uplink grants maps to a subset of uplink resource blocks out of the different subsets within the allocated range of uplink resource blocks. The scheduling processor is configured to transmit, via said transceiver, a single contention-based uplink grant message that indicates the allocated range of uplink resource blocks.

The node may carry out the preceding method of operations repeatedly for recurring transmission intervals, such as for recurring transmission sub-frames in the LTE context. For LTE, the node is an evolved NodeB, or eNodeB, also denoted as "eNB." More broadly, the node can be understood as some type of network base station.

In a complementary embodiment, a user terminal is configured to implement a method for making contention-based uplink transmissions in a wireless communication network. The method comprises receiving a single contention-based uplink grant message that indicates a range of uplink resource blocks allocated to a plurality of contention-based uplink grants within a given scheduling interval. The range of uplink resource blocks comprises different subsets of uplink resource blocks, where each contention-based uplink grant in the plurality of contention-based uplink grants maps to a subset of uplink resource blocks out of the different subsets within the allocated range of uplink resource blocks.

The method further includes selectively sending a contention-based uplink transmission on a particular subset of uplink resource blocks corresponding to one of the plurality of contention-based uplink grants. In at least one embodiment, the transmission is selective in the sense that the user terminal determines whether to make a contention-based uplink transmission and/or further determines which one of the subsets of uplink resource blocks to use for making the transmission.

In at least one such embodiment, the user terminal determines whether to make the transmission based on the state of its uplink transmit buffer, e.g., in dependence on whether it has data to send. The user terminal further determines which particular subset of uplink resource blocks to use within the allocated range via random selection, for example. Randomizing subset selection decreases the likelihood of actual contention between two or more user terminals making contention-based uplink transmissions responsive to the contention-based uplink grant message. As a further non-limiting example of reducing instances of actual contention, individual ones in a plurality of user terminals may be configured to make a probabilistic decision about whether to attempt a contention-based uplink transmission, such that the probability at which individual terminals in a group attempt a contention based uplink transmission in response to the contention-based uplink grant message varies across terminals in the group, and lowers the chance that they all will make such a transmission, even in cases where they all have uplink data to send.

Of course, the present invention is not limited to the brief summary of features and advantages above. Other aspects, advantages, and features will be apparent from the following detailed description of various example embodiments, and from the accompanying drawings.

BRIEF DESCRIPTION OF THE DRAWINGS

FIG. 2 is a diagram of an allocated range of uplink resource blocks, logically subdivided into subsets of resource blocks, where each subset represents a separate one of the contention-based uplink grants represented by a contention-based uplink grant message.

FIG. 3 is a diagram of known definition of an uplink resource block for an LTE example case.

FIGS. 6A and 6B illustrate a table of example Modulation and Coding Scheme, "MCS", selections, which can be used to control the MCS parameters adopted by a user terminal for making a contention-based uplink transmission.

FIG. 7 illustrates a table of access probability control values, which can be used to control the probability at which individual user terminals decide whether to make a contention-based uplink transmission.

DETAILED DESCRIPTION

Figure 1:
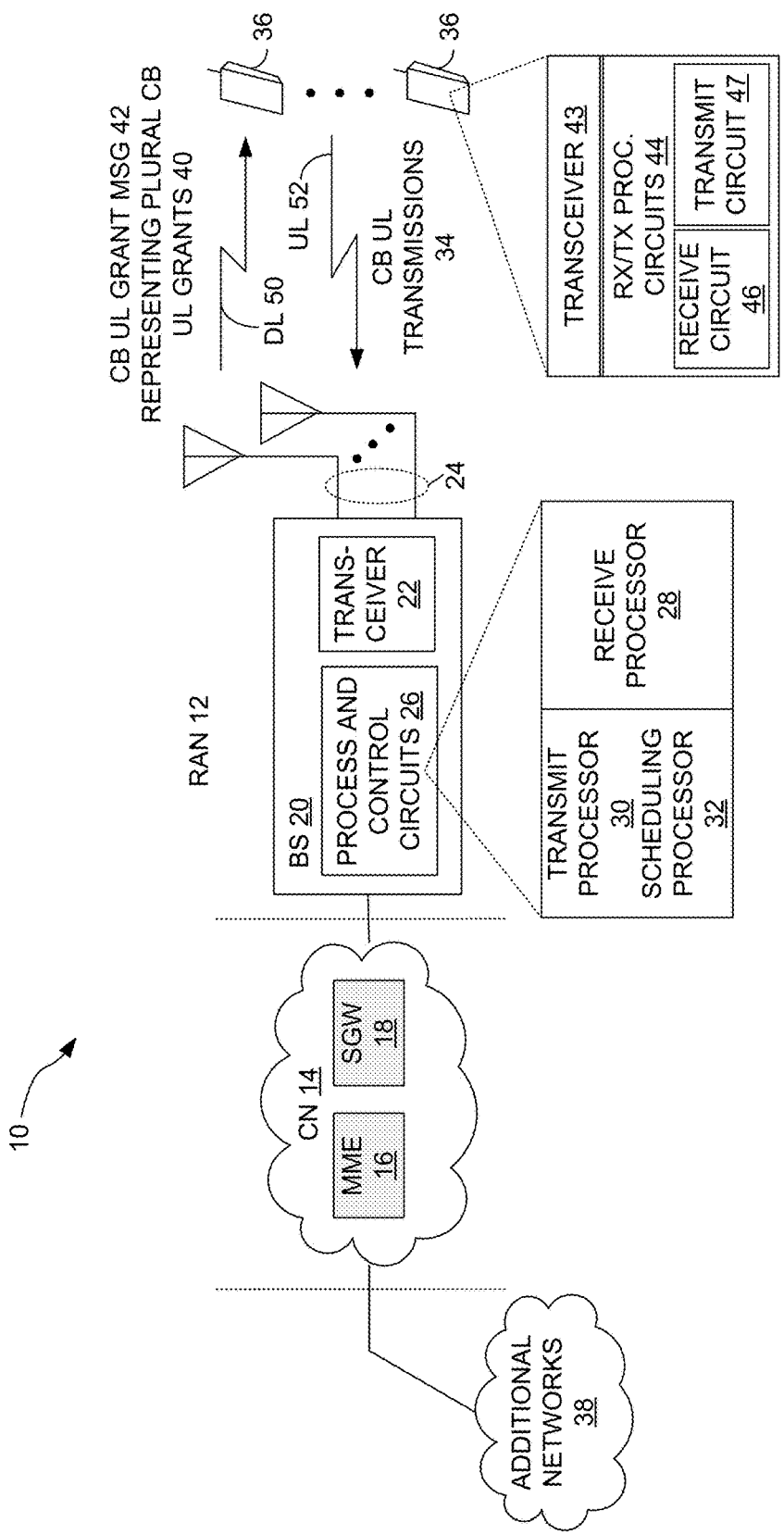
FIG. 1 is a block diagram of an embodiment of a wireless communication network that includes a base station configured to indicate multiple contention-based uplink grants in a contention-based uplink grant message, and one or more user terminals configured to receive and respond to such a message.

FIG. 1 partially illustrates a wireless communication network 10, including a Radio Access Network, "RAN", 12 and an associated Core Network, "CN", 14. In one example embodiment, the wireless communication network 10 comprises a 3GPP LTE network, wherein the RAN 12 is an LTE-based radio access network and the CN 14 is Evolved Packet Core, "EPC", network that includes a number of entities such as a Mobility Management Entity, "MME", 16 and a Serving Gateway, "SGW", 18 or other packet routing function.

While one base station 20 is shown in the RAN 12, it will be understood that the RAN 12 may include multiple base stations 20, each providing service in one or more respective cells—not illustrated. The illustrated base station 20 includes radiofrequency transceiver circuits 22, herein referred to as the "transceiver", which are operatively associated with one or more antennas 24. In a particular example, such as where the base station 20 is an LTE eNodeB, the transceiver 22 comprises transmit/receive circuitry configured for Orthogonal Frequency Division Multiplexing, "OFDM", and/or Single Carrier, "SC", OFDM operation and the antennas 24 include two or more antennas for Multiple-Input-Multiple-Output, "MIMO", operation.

Other example elements in the base station 20 include processing and control circuits 26, which may be fixed or programmable circuitry, including one or more computer processing circuits, such as Digital Signal Processors, DSPs, or the like. Such circuitry includes a receive processor 28 and transmit processor 30 that includes a scheduling processor 32. The receive processor 28 may comprise multiple processing circuits, including channel/signal quality estimators. A similar multi-circuit or complex circuit arrangement also may be used for implementation of the transmit processor 30. Regardless of the particular physical implementation, the receive processor 28 is functionally configured to process contention-based uplink transmissions 34 received from one or more user terminals 36, which the network 10 communicatively couples to each other and/or to one or more additional networks 38, such as the Internet.

According to the teachings herein, those contention-based uplink transmissions are advantageously scheduled and granted by the scheduling processor 32 in a manner that provides efficient signaling of a plurality of contention-based uplink grants 40 in a single contention-based uplink grant message 42. Such downlink signaling and corresponding uplink transmission behavior are based on the respective configurations of the base station 20 and the user terminals 36. In particular, the base station configuration in this regard may be defined at least in part according to the configuration of the included scheduling processor 32.

In an example of implementing the desired behavior on the user terminal side, the illustrated embodiment of the user terminal 36 includes a transceiver 43 and associated receive/transmit, "RX/TX", processing circuits 44, including a "receive circuit" 46 and a "transmit circuit" 47 that are configured for certain processing and control in response to receiving and evaluating contention-based uplink grant messages 42 from the base station 20. In this disclosure, the receive circuit 46 is also referred to as a grant processor 46, to indicate its functional operation in processing contention-based uplink grant messages 42 that are received through the transceiver 43.

In this sense, the base station 20 can be understood as one example of a wireless communication network node that is configured to signal contention-based uplink grants 40 to user terminals 36. In this example case, the base station's transceiver 22 is configured to transmit downlink signals 50 to the user terminals 36 and receive uplink signals 52 from the user terminals 36. The aforementioned scheduling processor 32 is operatively associated with the transceiver 22.

With reference now to FIG. 2, the scheduling processor 32 is configured to allocate a range 60 of uplink resource blocks, RBs, 62, for use by the user terminals 36 in making contention-based uplink transmissions 34. For example, the scheduling processor 32 can be understood as scheduling uplink transmissions in recurring time intervals, such as slots, sub-frames, or frames of the transmit signal structure used on the uplink, where certain uplink transmission resources are allocated in a given scheduling interval for making contention-based uplink transmissions 34. Here, a "given scheduling interval" is a scheduling interval of interest, such as an upcoming interval for which scheduling decisions are to be made. The time represented by the scheduling interval will be defined according to the protocols and standards at issue.

As is understood, the specific uplink resources allocated for a contention-based uplink transmission 34 in a particular scheduling interval can be selected by one or more user terminals 36 for use in attempting a contention-based uplink transmission 34. Thus, there is no guarantee that more than one user terminal 36 will not attempt to use the same resources for making their respective contention-based uplink transmissions 34.

The range 60 of uplink resource blocks 62 allocated for a given plurality of contention-based uplink grants 40 to be signaled together in a contention-based uplink grant message 42 comprises at least two subsets 64 of uplink resource blocks 62. In one or more embodiments, the subsets 64 are non-overlapping. In other embodiments, the subsets 64 may overlap. In either case, each subset 64 represents a separate contention-based uplink grant 40, such that the overall set of uplink resource blocks 62 comprising the allocated range 60 represents a plurality of contention-based uplink grants 40. According to this advantageous logical construct, the base station 20 treats each subset 64 as containing uplink resources for a separate contention-based uplink transmission 34, and this understanding is carried over to the user terminals 36.

According to this understanding, the scheduling processor 32 at the base station 20 transmits, via the transceiver 22, a contention-based uplink grant message 42 to the user terminals 36 that identifies the range 60 of uplink resource blocks 62. In one example configuration, the user terminals 36 already know the size M in number of uplink resource blocks of the subsets 64 defined within the range 60. Default information for the value of M can be pre-stored at the base station 20 and at the user terminals 36, or otherwise signaled as needed. In FIG. 2, then, one sees an integer number L of subsets 64, with each subset 64 of size M, meaning that the overall number N of uplink resource blocks 62 within the allocated range 60 is N=LM. This is to be understood as a non-limiting example.

However such information is made available to the user terminals 36, in the case where they know the value of M in advance of receiving the contention-based uplink grant message 42, each user terminal 36 can calculate the number of separate contention-based uplink grants 40 represented by the overall number N of uplink resource blocks 62 in the range 60 by dividing N by M. That calculation yields the number of subsets 64 included in the range 60, and the user terminals 36 are configured such that they recognize each subset 64 as representing a separate contention-based uplink grant 40. Thus, by signaling the allocated range 60 of resource blocks 62 via the contention-based uplink grant message 42, i.e. by sending a message that identifies the range 60, the base station 20 effectively signals a plurality of contention-based uplink grants 40 with one grant message 42.

In another example configuration, the base station 20 is configured to include information in the contention-based uplink grant message 42 that indicates the number of contention-based uplink grants 40 represented by the range 60. For example, the base station 20 includes a bit pattern or other information element that identifies the size M of each subset 64, allowing the user terminals 36 to directly calculate the overall number of subsets 64 included in the range 60, based on dividing the overall number N of resource blocks 62 in the range 60 by M. In other words, the number of separate contention-based uplink grants 40 represented by a given range 60 of uplink resource blocks 62 equals N/M. Alternatively, the base station 20 includes a bit pattern or other value that directly identifies the number of subsets 64 included within the range 60. This may be understood as implicitly indicating the size M of each subset 64, because the user terminals 36 can then divide the overall number N of resource blocks 62 in the range 60 by the indicated number of subsets 64, to determine the size M of each subset 64.

In either embodiment, it will be seen that the user terminals 36 can easily identify the subset boundaries within the range 60, such that the particular uplink resource blocks 62 belonging to each subset 64 are known. In another embodiment, the user terminals 36 store or otherwise receive or determine both the number of grants 40 represented by the allocated range 60 and the size of each such grant 40, in terms of uplink resource blocks 62. Such information allows, for example, each user terminal 36 to identify the uplink resource blocks 62 belonging to respective ones of the grants 40, even in the case where the subsets 64 of uplink resource blocks 62 are overlapping.

As will be detailed later, such knowledge of the grant structure within the allocated range 60 permits each user terminal 36 to make a discrete contention-based uplink transmission 34 on the resource blocks 62 belonging to a selected one of the subsets 64. While that transmission will contend with another transmission sent by one or more other user terminals 36 on the same subset 64 within the applicable scheduling interval, it will not contend with other transmissions on the other subsets 64. Again, it will be seen in this regard that each subset 64 represents a separate contention-based uplink grant 40 by the base station 20.

In another embodiment, the base station 20 is configured to transmit information indicating the number of contention-based uplink grants 40 represented by the range 60 prior to transmitting the contention-based uplink grant message 42. For example, the base station 20 transmits information identifying the subset size M. Note that such information may apply to multiple contention-based uplink grant messages 42, e.g., sent over a number of scheduling intervals.

In one embodiment, the base station 20 transmits information indicating the number of contention-based uplink grants 40 represented by the range 60 via signaling included in system broadcast information. In another embodiment, such signaling is sent in connection setup information that is signaled to each user terminal 36 during Radio Resource Control, "RRC", set up. Here, it will be understood that the information may originate in the base station 20—i.e., the base station 20 decides the information—or may originate at a higher-layer in the wireless communication network 10, such as at a central controller.

In a particular embodiment, the size M of the subsets 64 is fixed for at least a given scheduling interval of interest, and may be fixed over a number of such intervals. Here, the number of separate contention-based uplink grants 40 that can be "contained" within a range 60 of uplink resource blocks 62 is limited by the overall number N of uplink resource blocks 62 that are contiguously available for use in the scheduling interval—e.g., for a given sub-frame. The scheduling processor 32 in this embodiment is therefore configured to determine the overall number N of uplink resource blocks 62 to be allocated to the range 60 based on being configured to: identify a contiguous range of uplink resource blocks 62 available for a given scheduling interval; and allocate an overall number N of uplink resource blocks 62 from within the identified contiguous range that is equal to an integer multiple of a defined number of uplink resource blocks 62 to be used for each subset 64.

In other words, for the case where each subset 64 is of size M, the scheduling processor 32 determines an integer multiple of M uplink resource blocks 62 that will fit within the identified contiguous range of uplink resource blocks 62. Such processing ensures that there will be an integer number of whole M-sized subsets 64 of resource blocks 62 within the range 60 that is identified in the contention-based uplink grant message 42. One may refer to FIG. 3 for a non-limiting example for the LTE case, where an uplink resource block 62 comprises a plurality of OFDM resource elements, "REs," 66. Each RE 66 represents the intersection of one OFDM subcarrier and one OFDM symbol time. According to the LTE standards, one uplink resource block 62 includes REs 66 taken over seven OFDM symbol times and twelve OFDM subcarriers.

Thus, a contiguous range of uplink resource blocks 62 in this example comprises a plurality of resource blocks 62 that are adjacent in the frequency and/or time sense within the OFDM time/frequency grid. Of course, the term "uplink resource blocks" should be broadly understood and may have a different definition in another type of wireless communication network that "channelizes" transmission resources differently, e g either in time, frequency, or mathematical code. For more information about resource blocks 62 and other physical channel information in the example OFDM context, see TS 36.211, Evolved Universal Terrestrial Radio Access (E-UTRA); Physical channels and modulation, as published by the 3GPP.

Receive processing at the base station 20 complements the above-described signaling in the sense that the base station 20 understands that each subset 64 of uplink resource blocks 62 within the granted range 60 represents a possible respective contention-based uplink transmission from any one or more of the user terminals 36. In this regard, the base station 20 includes receiver processing circuits, e.g., the "receive processor" 28 shown in FIG. 1, that are configured to process contention-based uplink transmissions separately for each subset 64, for the given scheduling interval. As one example, the receive processor 28 is configured to demodulate/detect received signals received on resource blocks 62 within the range 60, based on its understanding that each subset 64 of resource blocks 62 represents a possible contention-based uplink transmission 34 from any one or more of the user terminals 36.

In the same or another embodiment, the base station 20 increases the number of contention-based uplink grants 40 that it makes with respect to any given scheduling interval by allocating more than one range or set of uplink resource blocks 62. This approach represents one mechanism contemplated herein for adapting the number of contention-based uplink grants that can be made based on the number of user terminals 36 being supported within one or more network cells associated with the base station 20. For example, the base station 20 determines that no one contiguous range is available of a size large enough to make the desired overall number of contention-based uplink grants 40 for a given scheduling interval and it therefore decides to allocate two ranges, which together provide the desired overall number of contention-based uplink grants 40.

Correspondingly, the base station 20 effectively generates the desired overall number of contention-based uplink grants 40 for that scheduling interval by allocating two sets or ranges 60 of resource blocks 62. Each range 60 of uplink resource blocks is contiguous and comprises subsets 64 of uplink resource blocks 62 but the resource blocks 62 need not be contiguous across the sets or ranges 60. In such embodiments, then, scheduling processor 32 is configured to allocate two or more sets or ranges 60 of uplink resource blocks 62, each range 60 representing a respective plurality of separate contention-based uplink grants 40, and to transmit, via said transceiver 22, two or more contention-based uplink grant messages 42, each corresponding to one of the two or more sets 60. As a further point of flexibility, in at least one embodiment the sets 60 need not be identical. For example, two or more of the sets or ranges 60 may differ in at least one of: the size M of the subsets 64 in the range 60, or the overall number of the subsets 64 in the range 60.

For an example LTE embodiment, the base station 20 is an eNodeB that is configured to transmit the contention-based uplink grant message 42 on an LTE Physical Downlink Control Channel, "PDCCH", using Downlink Control Information, "DCI", format 0. In one such embodiment, base station 20 is configured to manipulate the Modulation and Coding Scheme, "MCS", field that is defined for DCI Format 0 messages, to indicate different uplink transmission coding and multiplexing parameters for two or more of the contention-based uplink grants 40. For example, the base station 20 may indicate a different MCS selection to use for, e.g., half of the contention-based uplink grants 40 as compared to the other half.

In a corresponding embodiment of a user terminal 36, the user terminal is configured to "follow" the parameter information included in the contention-based uplink grant message 42. That is, in the case that the user terminal 36 sends a contention-based uplink transmission 34 on any of the one or more of the subsets 64, the user terminal 36 is configured to set the uplink transmission coding and multiplexing parameters used for such transmission in accordance with the parameter information, which may be information telling the user terminal 36 which MCS settings to select from an indexed table or other data structure.

In the same or another embodiment, the base station 20 includes, in the contention-based uplink grant message 42, signaling that indicates one or more access probabilities to be used by each user terminal 36 in probabilistically determining whether or not to perform a contention-based uplink transmission 34 using any one of the subsets 64 in the range 60. In a corresponding user terminal embodiment, the user terminal 36 is configured to "selectively" send a contention-based uplink transmission based on making a probabilistic decision on whether or not to transmit, whereby the user equipment 36 does or does not transmit according to a defined probability.

Further, the probability at which the user terminal 36 decides to send a contention-based transmission 34 can be set or otherwise controlled by the one or more access probabilities indicated in the contention-based uplink grant message 42. For example, the message 42 includes at least one access probability control value, e.g., a numeric value x given as 0<x<1. In turn, the user terminal 36 includes a random number generator or other processing circuitry that generates a random or pseudorandom value within the same numeric range. Alternatively, the grant message 42 indicates which access probability control value to select from a table or other data structure stored at the user terminal 36. The table itself may be signaled to the user terminal 36, such as at set up, or via broadcast information.

If the generated value is equal to or greater than the access probability control value x, the user terminal 36 makes a contention-based uplink transmission 34 on a selected one of the subsets 64; otherwise, it does not make the attempt. With this arrangement, one sees that the likelihood of actual contention on any one of the subsets 64 is reduced according to the probability at which individual user terminals 36 decided whether to attempt access.

Other logic may be used, such as by requiring that the generated value be less than the access control probability control value x. In any case, in at least one embodiment, the user terminals 36 are configured to make a probabilistic decision on whether or not to transmit by generating a random value and comparing it to the access probability control value included in or identified by the contention-based uplink grant message 42, and deciding whether or not to transmit in dependence on said comparison. Each user terminal 36 also may be configured to randomly select the particular subset 64 that it uses for making a contention-based uplink transmission 34.

More broadly, the user terminal 36, e.g., via its grant processor 46, is configured to receive a contention-based uplink grant message 42 that indicates a range 60 of uplink resource blocks 62 that are allocated for use in making contention-based uplink transmissions 34. As noted, the range 60 comprises a number of subsets 64 of uplink resource blocks 62, with each subset 64 representing a contention-based uplink grant 40. The number of subsets 64 represents the number of separate contention-based uplink grants 40.

The user terminal 36 further includes the previously identified transmit circuit 47, which is operatively associated with the transceiver 43 and configured to selectively send a contention-based uplink transmission 34 on one of the subsets 64 of uplink resource blocks 62. In an example embodiment, the "selective" sending of a contention-based uplink transmission 34 by the user terminal 36 is selective in the sense that the user terminal 36 only makes a transmission in the case that it has uplink data to send from its uplink transmit buffer—not shown.

However, in at least one embodiment, the selective sending is based on one or more further considerations, such as the probabilistic sending decision described earlier, where the user terminal 36 does or does not send a contention-based transmission 34 in dependence on a probability-weighted decision. In such a case, the probabilistic decision may be not to make a contention-based uplink transmission 34, even if there is buffered data to send. That type of constraint lessens the likelihood of contention on any given one of the subsets 64, particularly in cases where a large number of user terminals 36 all receive the same contention-based uplink grant message 42.

Figure 5:
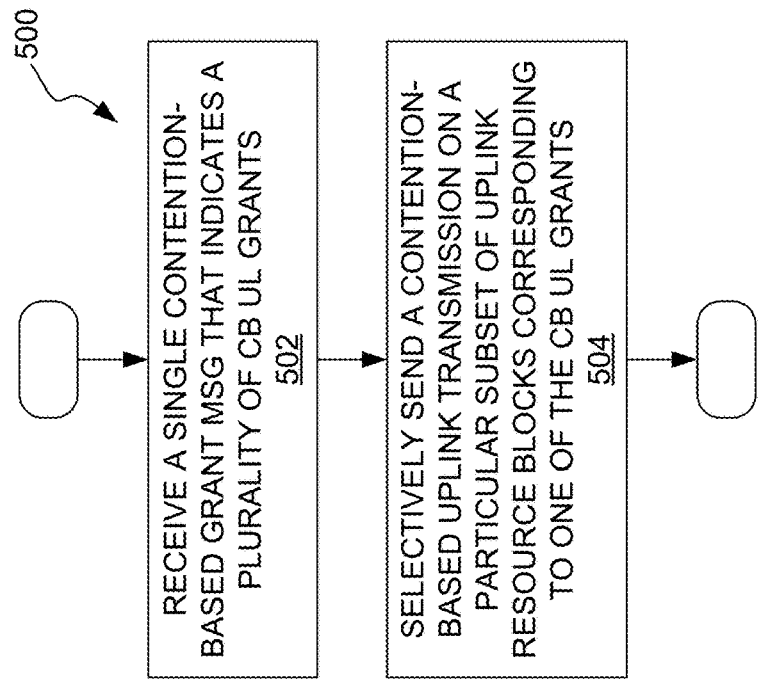
FIG. 5 is a logic flow diagram of one embodiment of a method of processing at a user terminal.
Figure 4:
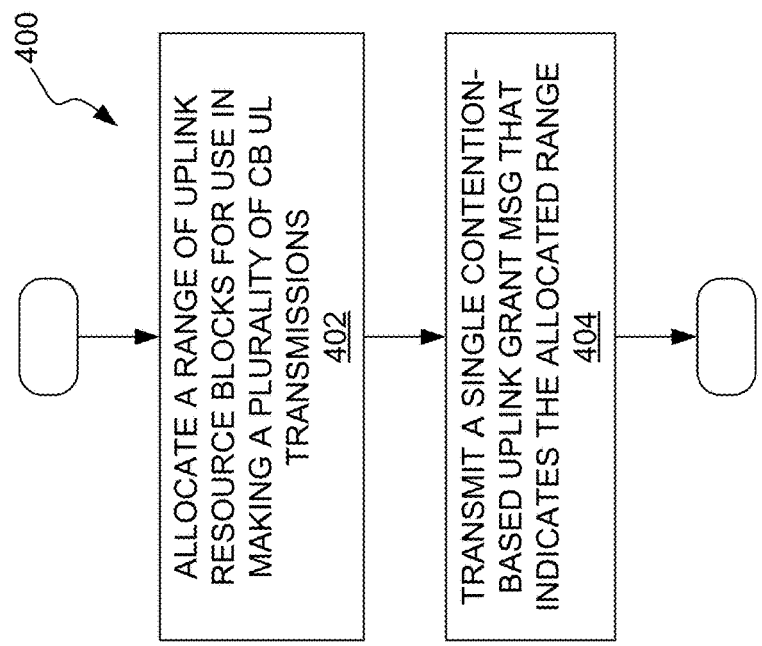
FIG. 4 is a logic flow diagram of one embodiment of a method of processing at a wireless communication network base station.

Keeping the above example embodiments in mind, FIGS. 4 and 5 illustrate example methods implemented on the network side and the user-terminal side, respectively. According to FIG. 4, the base station 20 implements a method 400 whereby it signals contention-based uplink grants to user terminals 36. It will be understood that the processing and control circuits 26 of the base station 20 are configured to implement the illustrated method according to dedicated electronic circuits, or by way of programmable digital processing circuitry, or a mix of both. For example, in at least one embodiment, the method 400 is at least partly implemented by the receive processor 28 and the transmit processor 30, including the scheduling processor 32, based on the execution of computer program instructions stored in a memory circuit/device within the base station 20.

The method 400 includes, for a given transmission interval, allocating at Step 402 a range 60 of uplink resource blocks 62 for use by the user terminals 36 in making contention-based uplink transmissions 34. As described previously, the range 60 of uplink resource blocks 62 comprises subsets 64 of uplink resource blocks 62 with each subset 64 representing a separate contention-based uplink grant 40. Assuming that the allocated range 60 of uplink resource blocks 62 equals an overall number N of resource blocks, the overall number of contention-based uplink grants 40 represented by the range 60 equals N/M, assuming that each of the subsets 64 includes M uplink resource blocks 62.

The method 400 continues with the base station 20 transmitting at Step 404 a contention-based uplink grant message 42 to the user terminals 36 that identifies the range 60 of uplink resource blocks 62. In at least one embodiment, such as where the user terminals already know the defined size M of the subsets 64, the identification of the allocated range 60 is sufficient to identify the plurality of contention-based uplink grants 40 represented in the contention-based uplink grant message 42 transmitted by the base station 20.

Thus, the above method 400 can be understood in one or more embodiments as a network node method, in which the node signals contention-based uplink grants 40 to user terminals 36 or other such user equipments. According to the method, the node allocates a range 60 of uplink resource blocks 62 for use in making a plurality of contention-based uplink grants 40 within a given scheduling interval, wherein the range 60 of uplink resource blocks 62 comprises different subsets 64 of uplink resource blocks 62. Further, each contention-based uplink grant 40 in the plurality of contention-based uplink grants 40 maps to a subset 64 of uplink resource blocks 62 out of the different subsets 64 within the allocated range 60 of uplink resource blocks 62. That is, each subset 64 represents a different one in the plurality of contention-based uplink grants 40 represented by the allocated range 60. The method further includes transmitting a single contention-based uplink grant message 42 that indicates the allocated range 60 of uplink resource blocks 62.

FIG. 5 illustrates a corresponding user equipment method 500, which is implemented at individual ones of the user terminals 36 or other such user equipments. The method may be repeatedly carried out over successive transmission intervals, e.g., on a sub-frame basis. Note that in one or more embodiments, it is not necessary that all user terminals 36 in a given plurality be able to recognize and respond to the contention-based uplink grant message 42. That is, there may be one or more newer terminals 36 that are programmed to recognize, process, and respond to the contention-based uplink grant message 42, while other terminals may not recognize the contention-based uplink grant message 42 and will therefore ignore it.

The method 500 includes an appropriately configured user terminal 36 receiving a contention-based uplink grant message 42 at Step 502. The message 42 indicates a range 60 of uplink resource blocks 62 allocated for use in making contention-based uplink transmissions 34, where the range 60 comprises subsets 64 of uplink resource blocks 62. Again, each subset 64 represents a separate contention-based uplink grant 40.

The method 500 further includes the user terminal 36 selectively sending a contention-based uplink transmission 34 on one of the subsets 64 of uplink resource blocks 62 at Step 504. Here, "selectively" as applied to the step of sending denotes the fact that the user terminal 36 may or may not actually make a contention-based transmission 34. If the user terminal 36 does decide to make the transmission, it will do so in accordance with the information indicated in the contention-based uplink grant message 42. In particular, any contention-based uplink transmission 34 attempted by the user terminal 36 will be made using the uplink resource blocks 62 included in one of the defined, subsets 64 included in the allocated range 60, as indicated in the contention-based uplink grant message 42. The user terminal 36 may, for example, select a particular one of the subsets 64 using a random or pseudorandom selection method.

In any case, in one or more embodiments the method 500 can be understood as a method implemented in a user terminal 36, or other such user equipment, for making contention-based uplink transmissions in a wireless communication network. In at least one such embodiment the method 500 comprises receiving a single contention-based uplink grant message 42 that indicates a range 60 of uplink resource blocks 62 allocated to a plurality of contention-based uplink grants 40 within a given scheduling interval. The range 60 of uplink resource blocks 62 comprises different subsets 64 of uplink resource blocks 62, where each contention-based uplink grant 40 in the plurality of contention-based uplink grants 40 maps to a subset 64 of uplink resource blocks 62 out of the different subsets 64 within the allocated range 60 of uplink resource blocks 62. Further, the method includes selectively sending a contention-based uplink transmission 34 on a particular subset 64 of uplink resource blocks 62 corresponding to one of the plurality of contention-based uplink grants 40.

In at least one embodiment, the user equipment "selectively" sends the contention-based uplink transmission 34 by deciding whether or not to make the contention-based uplink transmission 34, where that decision is conditioned on any one or more of the following evaluations: determining whether or not to transmit in dependence on the status of the uplink transmit buffer at the user terminal 36; and determining whether or not to transmit in dependence on a probabilistic decision, where the user terminal 36 decides whether or not to transmit according to some defined probability weighting.

Such probabilistic decision making helps reduce the likelihood of transmission collisions in the case where a potentially large number of user terminals 36 are in a position to attempt a contention-based uplink transmission 34 on any one of the subsets 64 of uplink resource blocks included in the range 60 of resource blocks 62 allocated for any given contention-based uplink grant message 42.

For example, assume that each user terminal 36 within a plurality of user terminals 36 is configured to make a contention-based uplink transmission 34 for a given scheduling interval if a value randomly generated by the user terminal 36 is equal to or greater than an access probability control value included in or otherwise identified by the contention-based uplink grant message 42. This example assumes that the user terminal 36 has data to send and it will be understood that the lack of any uplink data to send serves as a threshold condition for undertaking the probability-weighted decision as to whether or not an actual contention-based transmission 34 is made.

On this point, the access probability control value(s) may be known at the user terminals 36 in a variety of ways. One mechanism contemplated herein is to send or otherwise indicate the access probability control value using RRC signaling, etc. For the illustrated arrangement, one sees that by setting the access probability control value closer to one, one reduces the likelihood that the user terminal 36 will generate a random value that meets or exceeds the access probability control value. Of course, other ranges and conditions may be defined for making the probability-weighted decision.

Further, such arrangements are simply one of the possibilities contemplated herein and in at least some embodiments it is not necessary to have backwards compatibility with older user terminals. For example, an approach that minimizes the physical layer impact in LTE "reuses" the DCI format 0, "DCI=0 format," for PDCCH grants. Here, appropriately configured user terminals 36 recognize the new type of contention-based uplink grant message 42, while older terminals ignore the message.

In at least one embodiment relating to LTE networks, a plurality of contention-based uplink grants 40 are signaled in a single contention-based uplink grant message 42 using the DCI=0 format on the PDCCH. The information fields of the DCI format 0 include the following items:

DCI format 0/1A indication [1 bit], which is used to differentiate between DCI formats 0 and 1A, as these have the same size;

Hopping flag [1 bit], which indicates whether uplink frequency hopping is used;

Resource block allocation [size depends on cell bandwidth], which indicates the resource blocks for uplink transmission;

Modulation-and-coding scheme, MCS, including redundancy version [5 bits], which indicates the modulation scheme, code rate; note that the transport block size is calculated based on this field—and the resource block assignment;

New data indicator [1 bit], which indicates whether transmission is new data and soft buffer should be cleared;

Phase rotation of the uplink demodulation reference signal [3 bit], where different phase rotations can be used to separate between different transmissions in the receiver—this can be used e.g. in multi user MIMO;

Channel status request [1 bit], which is used to request channel status report;

Uplink index [1 bit], which is present only for TDD, to signal for which uplink sub-frame the grant is valid;

Transmit power control for PUSCH [2 bit]; and

Identity, such as contention-based Radio Network Temporary Identifier, "RNTI", which is not explicitly transmitted, but rather is included in CRC calculation used to verify the checksum of the scheduling grant [16 bit].

Assuming the use of DCI=0 format to signal a contention-based uplink grant message 42, it is recognized herein that certain information fields within the DCI format 0 may be open for use with the grant message 42. For example, the following information fields may be open:

DCI format 0/1A indication [1 bit] may be available for other use, as contention-based uplink grants are uplink only and 1A is a downlink format;

Channel status request [1 bit] may be available for use because the eNodeB does not know which ones of the user terminals 36 will respond to the contention-based uplink grant message 42;

Transmit power control for PUSCH [2 bit] may be available for use because the eNodeB does not know which user terminal 36 will respond to a given one of the contention-based uplink grant messages 42, therefore the eNodeB cannot control the Tx power;

New data indicator [1 bit] may be available in the case HARQ is not used for contention-based uplink transmissions 34;

Phase rotation of the uplink demodulation reference signal [3 bit] may be available because contention-based uplink grants may use fixed or randomly chosen rotation Indeed, assuming that an eNodeB wants to signal a plurality of contention-based uplink grants 40 with the same coding and modulation, the only field that will differ for the different contention-based uplink grants 40 will be the resource block, "RB", allocation, which indicates the uplink resource blocks that are reserved.

One embodiment of using one or more of the above information fields within a contention-based uplink grant message 42 that is sent using DCI format 0 takes some number of unused bits to indicate the overall number of separate contention-based uplink grants 40 represented by the range 60 of uplink resource blocks 62 indicated within a given contention-based uplink grant message 42. As an example of the earlier-noted approach of explicitly indicating the number of contention-based uplink grants 40 contained in the contention-based uplink grant message 42, one may take four unused bits in the DCI format 0 message, which provides for the indication of up to sixteen contention-based uplink grants 40. Yet another alternative is to fix the size of the subsets 64, i.e., to fix the size of each contention-based uplink grant 40. The fixed size can be signaled, and thus updated by sending new signaling, or can be fixed to some predefined known value such that no signaling is needed to indicate it. It will also be understood that, in one or more embodiments, if the size of the subsets 64 is known, then the user terminals 36 can calculate the number of contention-based uplink grants 40 represented by a given allocated range 60 of uplink resource blocks 62.

In another aspect of the disclosed teachings, the interpretation of the MCS field within the DCI format 0 message is changed to support different coding and multiplexing for the plurality of contention-based uplink grants 40 represented by a given contention-based uplink grant message 42. In this way, the plurality of contention-based uplink grant messages 40 can contain individual grants dimensioned for transmitting small amounts of data with robust coding for cell-edge users, i.e., user terminals 36 operating at the edges of the coverage area provided by the supporting eNodeB, as well as grants dimensioned for transmitting larger amounts of data with less coding for users with good channel conditions. Individual user terminals 36 within a plurality of user terminals 36 select among the offered contention-based uplink grants 40 based on, for example, their measurements of downlink signal quality.

FIGS. 6A and 6B together illustrate an example table of modulation, Transport Block Size, "TBS", index and redundancy version for the Physical Uplink Shared Channel, "PUSCH". A simple rule contemplated herein is that the first half of the contention-based uplink grants 40 contained in the contention-based uplink grant message 42 uses the signalled MCS and the other half uses an MCS with a certain relation to the signalled MCS. The relationship can be signalled via one or more of the otherwise unused bits in the signalled contention-based uplink grant message 42. For instance, if there are 2 bits allocated for this purpose, these two bits could be used to signal an offset in the MCS table to apply for the second half of the contention-based uplink grants 40 represented by a given contention-based uplink grant message 42. The offset can be indexed so that the bit positions correspond to different offsets, e.g. 0, +2, +4, +8 in the illustrated MCS table. If there are no bits within the contention-based uplink grant message 42 to signal the relation, the MCS offset can be sent via system broadcast information or sent via dedicated RRC signalling.

Thus, in at least one embodiment taught herein, signalling and an associated protocol are defined for MCS parameters that control the MCS used by any given user terminal 36 for sending a contention-based uplink transmission 34 in response to receiving a given contention-based uplink grant message 42. In one approach, an MCS based on the signaled MCS is used in a predefined manner, i.e., no additional bits are used for that, where the relationship or basis for determining the MCS may be configured via system broadcast information or dedicated RRC signaling. In another embodiment, the MCS used by a particular user terminal 36 is based on the signaled MCS and on the signaled or otherwise known "MCS increment index," which can comprise otherwise unused bits in the DCI format 0 message, as described above.

More broadly, for making a contention-based uplink transmission 34 in conjunction with receiving a contention-based uplink grant message 42, the specific MCS to use can be signaled explicitly to the user terminal 36, such as by signaling a related parameter setting, or the MCS to use can be signaled by specifying information that indicates which MCS to select from the table, according to the contention-based uplink grant 40 the user terminal 36 is responding to. Further, the MCS to use can be indicated by signaling the indexing/incrementing rule that should be used with an MCS table, such as that shown in FIGS. 6A and 6B.

If the eNodeB supports blind decoding, an MCS increment index can be applied to all contention-based uplink grants 40, and then the eNodeB can blindly detect the used format. The support for blind decoding can be signaled via system broadcast information or dedicated RRC signaling.

In the same or another embodiment, otherwise unused bits in a DCI format 0 grant are used to signal an access probability, e.g., in the form of an access probability control value. The access probability control value is used to reduce collision probability when many user terminals 36 are contending for the same contention-based uplink resources. User terminals 36 wanting to transmit on one of the subsets 64 of uplink resource blocks 62 draw a random value [0 . . . 1] and compare it to the access probability control value signaled in the contention-based uplink grant to decide whether to transmit or not. The actual fractional value of the access probability control value need not be signaled; rather, two or more otherwise unused bits can be used to signal which one of four predefined access control probability values are to be used at the user terminal 36. Of course, more than four or fewer than four choices can be defined.

Such values can be included in a table, such as shown in FIG. 7. The table can be signaled to the user terminals 36 via system broadcast information, or via RRC signaling such as at connection setup. Regardless, one sees a number of table positions that are indexed or otherwise identified by binary values, 00, 01, etc. This allows the network to identify a particular one of the predefined access probability control values for a user terminal 36 to use simply by signaling the table index value.

Of course, the present invention is not limited to the above example embodiments, which are illustrative rather than limiting. Instead, the present invention is limited only by the presented claims and their legal equivalents.

What is claimed is:

1. A method in a wireless communication network node for signaling contention-based uplink grants to user equipments, said method comprising:
dynamically allocating a continuous range of uplink resource blocks for use in making a plurality of contention-based uplink grants for a given scheduling interval, wherein the range of uplink resource blocks comprises different subsets of uplink resource blocks and wherein each contention-based uplink grant in the plurality of contention-based uplink grants maps to a subset of uplink resource blocks out of the different subsets within the allocated range of uplink resource blocks;
indicating a number of contention-based uplink grants represented by the allocated continuous range of uplink resource blocks; and
transmitting a single contention-based uplink grant message on a physical downlink control channel that indicates the allocated range of uplink resource blocks from which the user equipment selects one of the subsets of uplink resource blocks that corresponds to one of the contention-based uplink grants to send a contention-based uplink transmission within the given scheduling interval.

2. The method of claim 1, further comprising processing uplink transmissions received on the different subsets of the allocated range of uplink resource blocks as separate user equipment transmissions, each of said uplink transmissions being responsive to and corresponding to a different one of the plurality of contention-based uplink grants mapped to the allocated range of uplink resource blocks.

3. The method of claim 1, wherein said step of allocating comprises allocating two or more different ranges of uplink resource blocks for use in making two or more different pluralities of contention-based uplink grants within the given scheduling interval, each said two or more different ranges of uplink resource blocks comprising different subsets of uplink resource blocks, and wherein the step of transmitting comprises transmitting a respective single contention-based uplink grant message for each plurality of contention-based uplink grants out of the two or more different pluralities of contention-based uplink grants.

4. The method of claim 3, wherein a size of the two or more different allocated ranges of uplink resource blocks, or a size of the different subsets of uplink resource blocks within each of the allocated two or more different ranges of uplink resource blocks, or both, differ between at least two of the two or more different pluralities of contention-based uplink grants.

5. The method of claim 1, wherein the wireless communication network node comprises an eNodeB configured for operation in a Long Term Evolution, LTE, network, and wherein said step of transmitting the single contention-based uplink grant message comprises transmitting the contention-based uplink grant message on an LTE Physical Downlink Control Channel (PDCCH) using Downlink Control Information (DCI) Format 0.

6. The method of claim 5, further comprising manipulating the Modulation and Coding Scheme (MCS) field that is defined for DCI Format 0 messages, to indicate different uplink transmission coding and multiplexing parameters for two or more of the contention-based uplink grants.

7. The method of claim 5, further comprising including signaling within the single contention-based uplink grant message that indicates one or more access probabilities to be used by the user equipments in determining whether or not to perform a contention-based uplink transmission corresponding to one of the plurality of contention-based uplink grants.

8. The method of claim 1, further comprising including in said single contention-based uplink grant message information indicating the number of contention-based uplink grants represented by the allocated range of uplink resource blocks.

9. The method of claim 1, further comprising, prior to said step of transmitting the single contention-based uplink grant message, transmitting information indicating the number of contention-based uplink grants represented by the allocated range of uplink resource blocks.

10. The method of claim 9, wherein said step of transmitting the information indicating the number of contention-based uplink grants comprises including the information indicating the number of contention-based uplink grants in system broadcast information, or in connection setup information that is signaled to each user terminal during Radio Resource Control (RRC) setup.

11. The method of claim 1, further comprising storing default size information for the contention-based uplink grants, which default size information commonly defines the size of the different subsets in terms of the number of uplink resource blocks to be included in each subset.

12. The method of claim 1, further comprising determining an overall number of uplink resource blocks to be included in said allocated range of uplink resource blocks based on: identifying a contiguous range of uplink resource blocks available for the given scheduling interval; and determining a number of whole, non-overlapping subsets of uplink resource blocks that can be formed within the identified contiguous range of available uplink resource blocks, and setting the overall number of allocated uplink resource blocks to be included in said range of uplink resource blocks so that it includes the number of whole, non-overlapping subsets of uplink resource blocks.

13. The method of claim 1, wherein each uplink resource block includes uplink resource elements that represent a plurality of symbols and a plurality of frequency subcarriers.

14. A wireless communication network node configured to signal contention-based uplink grants to user equipments, said wireless communication network node comprising:
a transceiver configured to transmit downlink signals to said user equipments and receive uplink signals from said user equipments; and
a scheduling processor operatively associated with the transceiver and configured to:
dynamically allocate a continuous range of uplink resource blocks for use in making a plurality of contention-based uplink grants for a given scheduling interval, wherein the range of uplink resource blocks comprises different subsets of uplink resource blocks and wherein each contention-based uplink grant in the plurality of contention-based uplink grants maps to a subset of uplink resource blocks out of the different subsets within the allocated range of uplink resource blocks;
indicate a number of contention-based uplink grants represented by the allocated continuous range of uplink resource blocks; and
transmit, via said transceiver, a single contention-based uplink grant message on a physical downlink control channel that indicates the allocated range of uplink resource blocks from which the user equipment selects one of the subsets of uplink resource blocks that corresponds to one of the contention-based uplink grants to send a contention-based uplink transmission within the given scheduling interval.

15. The wireless communication network node of claim 14, wherein said wireless communication network node further comprises one or more receiver processing circuits that are configured to process uplink transmissions received on the different subsets of the allocated range of uplink resource blocks as separate user equipment transmissions, each of said uplink transmissions being responsive to and corresponding to a different one of the plurality of contention-based uplink grants mapped to the allocated range of uplink resource blocks.

16. The wireless communication network node of claim 14, wherein said scheduling processor is configured to allocate two or more different ranges of uplink resource blocks for use in making two or more different pluralities of contention-based uplink grants within the given scheduling interval, each said two or more different ranges of uplink resource blocks comprising different subsets of uplink resource blocks, and to transmit, via said transceiver, a respective single contention-based uplink grant message for each plurality of contention-based uplink grants out of the two or more different pluralities of contention-based uplink grants.

17. The wireless communication network node of claim 16, wherein a size of the two or more different allocated ranges of uplink resource blocks, or a size of the different subsets of uplink resource blocks within each of the allocated two or more different ranges of uplink resource blocks, or both, differ between at least two of the two or more different pluralities of contention-based uplink grants.

18. The wireless communication network node of claim 14, wherein the wireless communication network node is an eNodeB configured for operation in a Long Term Evolution (LTE) network, and wherein the wireless communication network node is configured to transmit the single contention-based uplink grant message on an LTE Physical Downlink Control Channel (PDCCH) using Downlink Control Information (DCI) Format 0.

19. The wireless communication network node of claim 18, wherein the wireless communication network node is configured to manipulate the Modulation and Coding Scheme (MCS) field that is defined for DCI Format 0 messages, to indicate different uplink transmission coding and multiplexing parameters for two or more of the contention-based uplink grants.

20. The wireless communication network node of claim 18, wherein the wireless communication network node is configured to include signaling within the single contention-based uplink grant message that indicates one or more access probabilities to be used by the user equipments in determining whether or not to perform a contention-based uplink transmission corresponding to one of the plurality of contention-based uplink grants.

21. The wireless communication network node of claim 14, wherein the wireless communication network node is configured to include in said single contention-based uplink grant message information indicating the number of contention-based uplink grants represented by the allocated range of uplink resource blocks.

22. The wireless communication network node of claim 14, wherein the wireless communication network node is configured to transmit information indicating the number of contention-based uplink grants represented by the allocated range of uplink resource blocks prior to transmitting the single contention-based uplink grant message.

23. The wireless communication network node of claim 22, wherein the wireless communication network node is configured to transmit the information indicating the number of contention-based uplink grants via signaling included in system broadcast information, or via signaling included in connection setup information that is signaled to each user terminal during Radio Resource Control (RRC) setup.

24. The wireless communication network node of claim 14, wherein the wireless communication network node is configured to use default size information for defining the size of the different subsets in terms of the number of uplink resource blocks to be included in each subset.

25. The wireless communication network node of claim 14, wherein the scheduling processor is configured to determine an overall number of uplink resource blocks to be included in said allocated range of uplink resource blocks based on being configured to: identify a contiguous range of uplink resource blocks available for the given scheduling interval; and determine a number of whole, non-overlapping subsets of uplink resource blocks that can be formed within the identified contiguous range of available uplink resource blocks, and set the overall number of allocated uplink resource blocks to be included in said range of uplink resource blocks so that it includes the number of whole, non-overlapping subsets of uplink resource blocks.

26. A method in a user equipment for making contention-based uplink transmissions in a wireless communication network, said method comprising:
receiving a single contention-based uplink grant message on a physical downlink control channel that indicates a continuous range of uplink resource blocks that are dynamically allocated to a plurality of contention-based uplink grants for a given scheduling interval and from which the user equipment selects one of the subsets of uplink resource blocks that corresponds to one of the contention-based uplink grants to send a contention-based uplink transmission within the given scheduling interval, wherein the range of uplink resource blocks comprises different subsets of uplink resource blocks and wherein each contention-based uplink grant in the plurality of contention-based uplink grants maps to a subset of uplink resource blocks out of the different subsets within the allocated range of uplink resource blocks;
receiving an indication of a number of contention-based uplink grants represented by the allocated continuous range of uplink resource blocks; and
selectively sending a contention-based uplink transmission on a particular subset of uplink resource blocks corresponding to one of the plurality of contention-based uplink grants.

27. The method of claim 26, wherein the user equipment is configured for operation in a Long Term Evolution (LTE) network.

28. The method of claim 26, wherein said step of selectively sending the contention-based uplink transmission comprises making a probabilistic decision on whether or not to transmit, whereby the user equipment does or does not transmit according to a defined probability.

29. The method of claim 28, wherein the contention-based uplink grant message includes an access probability control value, and said user equipment makes said probabilistic decision on whether or not to transmit by generating a random value and comparing it to the access probability control value and deciding whether or not to transmit in dependence on said comparison.

30. The method of claim 15, wherein the single contention-based uplink grant message includes parameter information indicating different coding and multiplexing parameters that are to be used for different contention-based uplink grants in the plurality of contention-based uplink grants, and wherein the step of selectively sending the contention-based uplink transmission comprises setting the uplink transmission coding and multiplexing parameters used for the contention-based uplink transmission in accordance with the parameter information.

31. The method of claim 15, wherein said receiving includes determining the number of contention-based uplink grants that are represented by the indicated range of uplink resource blocks based on at least one of:
  receiving or otherwise storing information identifying the number of different subsets included in the indicated range of uplink resource blocks;
  receiving or otherwise storing information identifying the number of uplink resource blocks that defines each subset of uplink resource blocks and calculating the number of different subsets that are included within the indicated range of uplink resource blocks; or
  receiving or otherwise storing information identifying both the size of each grant within the allocated range and the number of grants within the allocated range.

32. A user equipment configured to make contention-based uplink transmissions in a wireless communication network, said user equipment comprising:
  a transceiver configured to transmit uplink signals to the wireless communication network and to receive downlink signals from the wireless communication network;
  a receive circuit operatively associated with said transceiver and configured to:
    receive a single contention-based uplink grant message on a physical downlink control channel that indicates a continuous range of uplink resource blocks that are dynamically allocated to a plurality of contention-based uplink grants for a given scheduling interval and from which the user equipment selects one of the subsets of uplink resource blocks that corresponds to one of the contention-based uplink grants to send a contention-based uplink transmission within the given scheduling interval, wherein the range of uplink resource blocks comprises different subsets of uplink resource blocks and wherein each contention-based uplink grant in the plurality of contention-based uplink grants maps to a subset of uplink resource blocks out of the different subsets within the allocated range of uplink resource blocks; and
    receive an indication of a number of contention-based uplink grants represented by the allocated continuous range of uplink resource blocks; and
  a transmit circuit operatively associated with said transceiver and configured to selectively send a contention-based uplink transmission on a particular subset of uplink resource blocks corresponding to one of the plurality of contention-based uplink grants.

33. The user equipment of claim 32, wherein the user equipment is configured for operation in a Long Term Evolution (LTE) network.

34. The user equipment of claim 32, wherein said user equipment is configured to selectively send the contention-based uplink transmission based on being configured to make a probabilistic decision on whether or not to transmit, whereby the user equipment does or does not transmit according to a defined probability.

35. The user equipment of claim 34, wherein the contention-based uplink grant message includes an access probability control value, and wherein said user equipment is configured to make said probabilistic decision on whether or not to transmit based on generating a random value and comparing it to the access probability control value and deciding whether or not to transmit in dependence on said comparison.

36. The user equipment of claim 32, wherein the single contention-based uplink grant message includes parameter information indicating different coding and multiplexing parameters that are to be used for different contention-based uplink grants in the plurality of contention-based uplink grants, and wherein said user equipment is configured to set the uplink transmission coding and multiplexing parameters used for selectively sending the contention-based uplink transmission in accordance with the parameter information.

37. The user equipment of claim 32, wherein the user equipment is configured to determine the number of contention-based uplink grants that are represented by the indicated range of uplink resource blocks based on knowing or receiving information identifying the number of different subsets included in the indicated range of uplink resource blocks, or based on knowing or receiving information identifying the number of uplink resource blocks that defines each subset of uplink resource blocks and calculating the number of different subsets that are included within the indicated range of uplink resource blocks.

* * * * *